(12) United States Patent
Shoari et al.

(10) Patent No.: US 10,432,002 B2
(45) Date of Patent: Oct. 1, 2019

(54) APPARATUS AND METHODS FOR SUSTAINABLE BATTERY CHARGING

(71) Applicants: Arian Shoari, San Diego, CA (US); Mona Komeijani, San Diego, CA (US)

(72) Inventors: Arian Shoari, San Diego, CA (US); Mona Komeijani, San Diego, CA (US)

(*) Notice: Subject to any disclaimer, the term of this patent is extended or adjusted under 35 U.S.C. 154(b) by 0 days.

(21) Appl. No.: 15/694,979

(22) Filed: Sep. 4, 2017

(65) Prior Publication Data
US 2018/0013302 A1 Jan. 11, 2018

Related U.S. Application Data

(63) Continuation-in-part of application No. 15/396,493, filed on Dec. 31, 2016.

(60) Provisional application No. 62/304,944, filed on Mar. 8, 2016.

(51) Int. Cl.
| | | |
|---|---|---|
| H02J 7/00 | (2006.01) | |
| G06F 1/20 | (2006.01) | |
| H04M 1/725 | (2006.01) | |
| H04W 4/02 | (2018.01) | |
| H01R 13/62 | (2006.01) | |
| G08B 21/18 | (2006.01) | |
| G08B 21/24 | (2006.01) | |
| H04M 1/02 | (2006.01) | |
| G08B 21/02 | (2006.01) | |
| H04W 88/02 | (2009.01) | |
| H04B 17/23 | (2015.01) | |
| H04B 17/27 | (2015.01) | |
| H04B 17/318 | (2015.01) | |
| B60L 53/14 | (2019.01) | |

(52) U.S. Cl.
CPC ............ *H02J 7/0045* (2013.01); *G06F 1/203* (2013.01); *G08B 21/0247* (2013.01); *G08B 21/182* (2013.01); *G08B 21/24* (2013.01); *H01R 13/6205* (2013.01); *H02J 7/0029* (2013.01); *H04M 1/0202* (2013.01); *H04M 1/0262* (2013.01); *H04M 1/7253* (2013.01); *H04W 4/023* (2013.01); *B60L 53/14* (2019.02); *H04B 17/23* (2015.01); *H04B 17/27* (2015.01); *H04B 17/318* (2015.01); *H04M 2250/12* (2013.01); *H04W 88/02* (2013.01)

(58) Field of Classification Search
CPC ..... H04W 88/02; H02J 7/0045; H02J 7/0029; H01R 13/6205; B60L 11/1816
USPC ........................................................ 455/573
See application file for complete search history.

(56) References Cited

U.S. PATENT DOCUMENTS

| | | | | |
|---|---|---|---|---|
| 7,311,526 B2* | 12/2007 | Rohrbach | .......... | H01R 13/6205 439/39 |
| 7,641,477 B2* | 1/2010 | DiFonzo | ............ | H01R 13/6205 439/39 |
| 7,859,219 B2* | 12/2010 | Harris | ................. | B60L 11/1818 320/104 |

(Continued)

*Primary Examiner* — William Nealon

(57) ABSTRACT

This disclosure describes methods and apparatus sustainable battery charging. In one of the embodiments, a charger and plugging mechanism is presented to prevent overcharging of the battery. The plug will automatically detach the power cord from the device when the battery is fully charged. Other feedback controlled detaching mechanisms has also been disclosed such as the one disconnects the charger cord when the internal temperature of the device gets hotter than a preset threshold.

4 Claims, 17 Drawing Sheets

(56) References Cited

U.S. PATENT DOCUMENTS

| | | | |
|---|---|---|---|
| 2007/0217233 A1* | 9/2007 | Lim | H02M 1/4208 |
| | | | 363/43 |
| 2009/0206800 A1* | 8/2009 | Kudou | H01R 13/6205 |
| | | | 320/162 |
| 2010/0261360 A1* | 10/2010 | Li | H02J 7/0032 |
| | | | 439/152 |
| 2014/0350764 A1* | 11/2014 | Arai | B60W 40/10 |
| | | | 701/22 |
| 2015/0180249 A1* | 6/2015 | Jeon | H02J 5/005 |
| | | | 320/108 |
| 2015/0364874 A1* | 12/2015 | Lim | H01R 13/7137 |
| | | | 439/620.22 |

* cited by examiner

| Goal 1 | Reducing Purchase Frequency | | |
|---|---|---|---|
| Unsustainable behavior | Replaces before obsolete | Does not repair or upgrade | Buyer's remorse |
| Thinking system | Automatic | Reflective | Reflective |
| Design concept | Emotional design | Anticipatory design | Interaction design |
| Design techniques | Create attachment using feeling and memories | Physical form enables upgradability | Educate user to make better purchasing decision |
| Potential application to smartphone | Case can be customized using photos to create stronger connection with user | Modular phone allows user to upgrade or change a specific part | Packaging better comunicates product features and details to reflect their needs |

Fig. 3

| Goal 2 | Reduce Energy Consumption | | | | |
|---|---|---|---|---|---|
| Unsustainable behavior | Overcharging | Undercharging | | Overheating | |
| Thinking system | Reflective | Reflective | Automatic | Reflective | Automatic |
| Design concept | Interaction design | Interaction design | Ergonomic design | Interaction design | Ergonomic design |
| Design techniques | Notify user about energy consumption | Notify user about optimal charging | Change physical form to optimize performance | Notify user about phone temprature | Change physical form to promote cooling |
| Potential application to smartphone | Text or image notification explains monetary cost of energy usage | Prompt user to wait and not unplug the charger until the phone is fully charged | Charger requires extra step to disconnect from device when not fully charged | An alert notifies user to stop using the phone when it gets hot | Squeezable frame circulates air and cools down the battery |

Fig. 4

| Goal 3 | | Reducing Physical Damage | | | | |
|---|---|---|---|---|---|---|
| Unsustainable behavior | | Dropping the phone | Environmental stress | | Losing the phone | |
| Thinking system | | Automatic | Reflective | Reflective | Reflective | Automatic |
| Design concept | | Ergonomic design | Interaction design | Anticipatory design | Interaction design | Ergonomic design |
| Design techniques | | Change physical form to enhance durability | Notify user about phone temperature | Integrate sensors to detect and prevent failure | Integrate sensors to prevent phone loss | Enable physical attachment with user |
| Potential application to smartphone | Shatterproof materials to prevent damage if dropped | Slip proof or easy to grip materials to prevent dropping | Text or image alerts about temperature extremes | Automatic shut down if exposed to stress (water, temperature) | Alert user when product is left behind in public places | Wristlet or lanyard accessory attaches to user |

Fig. 10

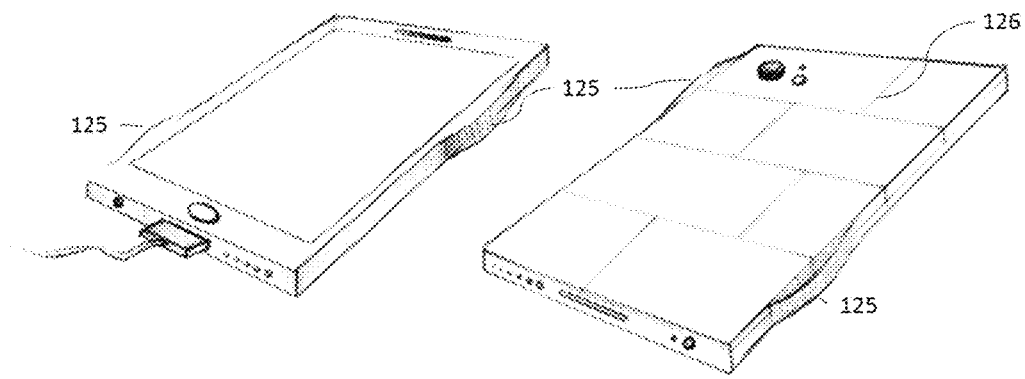

Fig. 11

| Goal 4 | Encouraging Sustainable End of Life | | |
|---|---|---|---|
| Unsustainable behavior | Does not recycle | Keep in storage | |
| Thinking system | Reflective | Reflective | Reflective |
| Design concept | Interaction design | Interaction design | Anticipatory design |
| Design techniques | Notify user about recycling options | Notify user about reuse options | Change packaging form to provide dual purpose |
| Potential application to smartphone | Text or image alert identifies recycling facilities and location and community events | Alert user of someone in need of used phone | Packaging converts to a stand during use and then to a mailer for recycling or donation |

Fig. 12

$Nr$ is the number of receiver antennas
$Mt$ is the number of transmitter antennas

APPARATUS AND METHODS FOR SUSTAINABLE BATTERY CHARGING

CROSS REFERENCE TO RELATED APPLICATIONS

This application claims the benefit of U.S. Provisional Application No. 62/304,944 filed on Mar. 8, 2016, U.S. Provisional Application No. 62/321,906 filed on Apr. 13, 2016, and U.S. Non-Provisional application Ser. No. 15/396,493 filed on Dec. 31, 2016 the contents of which are incorporated by reference herein.

STATEMENT REGARDING FEDERALLY SPONSORED RESEARCH

This invention was made with government support under CBET 1236447 awarded by National Science Foundation. The government has certain rights in the invention.

COPYRIGHT NOTICE

Some parts of the disclosure of this patent application contain materials that are subject to copyright protection. The owner of the copyright has no objection to the facsimile re-production of this disclosure by anyone as it appears in the Patent and Trademark Office Patent file or records, but otherwise reserves all (copyright or mask work) rights whatsoever.

BACKGROUND OF THE INVENTION

Market growth in consumer electronics generates a lot of environmental burdens including contamination due to scarce materials, greenhouse effect, and e-waste management challenges. Eco-design is a promising approach to reduce the environmental effect of electronics by incorporating sustainability concerns into product design process. However, most approaches do not overcome the unsustainable use such as frequently replacing a device before end of life.

Thus, the design of electronic parts and accessories play a key role in sustainable behavior for many types of products such as, but not limited to, consumer electronics, appliances, and buildings. To date, limited guidance has been developed to help designers create a product with a reduced environmental impact. However, the DWI method does not promise affecting how user thinks.

A much more effective design strategy is to affect the human thinking system in a sustainable way. In this application, we employ a Sustainable Behavior Design (SBD) framework to use common design concepts to affect the human thinking system to increase sustainable awareness among the users. Alternatively, it can be adapted to promote sustainable behaviors among users in an unconscious manor. The SBD framework is demonstrated using a case study on a smartphone which can be applied to tablets, pocket PCs, PDAs, laptops, or personal digital assistants. The reimagined smartphone design integrates solutions to increase life cycle of the device.

A group of novel designs for smartphones and their accessories and packaging is presented in this application. These designs help preventing phone loss, preventing over charging of batteries, decreasing packaging waste and encouraging sustainable behavior among users.

SUMMARY OF THE INVENTION

This disclosure describes novel schemes and utilities that promote sustainable usage of smartphones. It describes apparatus and methods to prevent phone loss, prevent overheating problems, decrease energy waste of the battery, prevent overcharging, decrease packaging waste, and encourage sustainable behavior among users to increase the life of the electronic product. The apparatus and methods may be applied to promote sustainable usage of other electronic devices such as tablets, laptops, pocket PCs, personal digital assistants (PDAs), e-readers, wearable devices, and etc. In addition, a framework has been presented which can be applied to promote sustainable behavior for any consumer electronics products including smartphones.

BRIEF DESCRIPTION OF THE DRAWINGS

FIG. 3: SBD framework applied to meet Goal 1 "Reducing Purchase Frequency":

FIG. 4: SBD Framework applied to meet Goal 2: "Reducing Energy Consumption

FIG. 10: SBD Framework applied to meet goal 3 "Minimizing Physical Damage": example of how to extend product lifespan by choosing materials, sensors, or accessories to prevent damage to the device.

FIG. 11: An easy to grip or slip proof material on the smartphone frame.

FIG. 12: SBD Framework applied to meet Goal 4: identifying potential solutions to educate or inform users about where to recycle or potential reuse options.

DETAILED DESCRIPTION

1. A Sustainable Design Process

Figure 1:
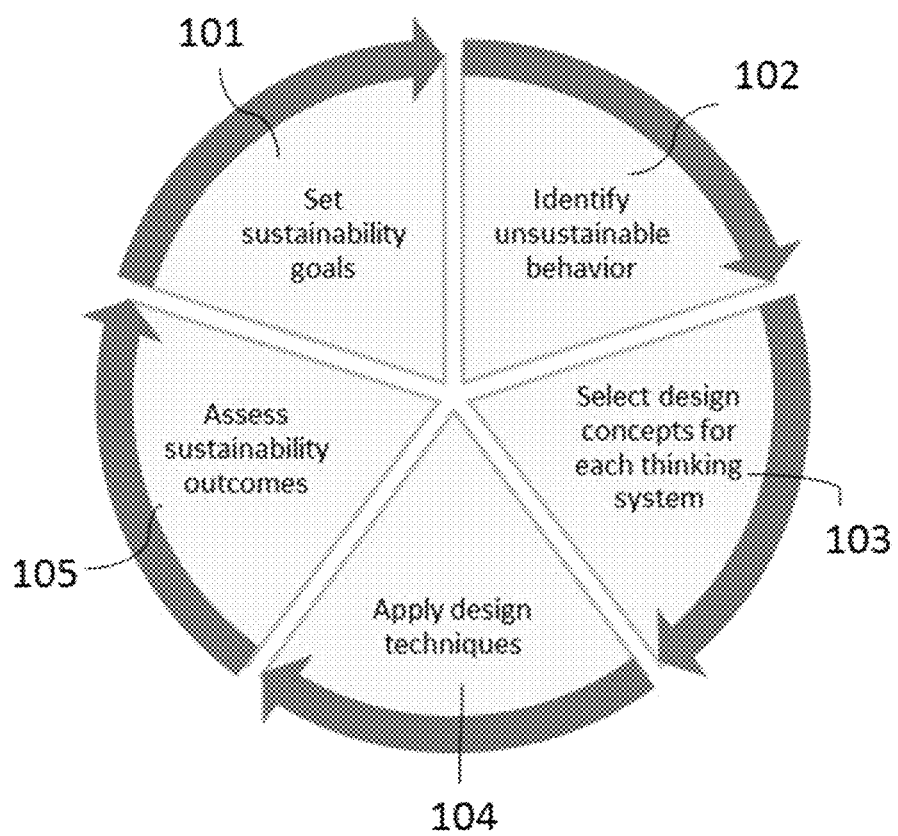
FIG. 1: Iterative process of applying the SBD framework.

To guide the development of sustainable products, a Sustainable Behavior Design (SBD) framework is presented. Design solutions are linked to the reflective and automatic aspects of the human thinking system. To develop the framework, human behavior theories such as Nudge Theory have been considered to differentiate between conscious and unconscious decisions by people.

The goal of this framework is to develop and apply an integrated suite of eco-design strategies based on the human thinking system to effectively guide the development of sustainable products. This Sustainable Behavior Design (SBD) framework starts by defining the design goals 101, and then addressing unsustainable behaviors 102. The designer selects the design concept for each thinking system 103. Then she/he apply design techniques 104. Finally, she/he assess sustainability outcomes 105. Thus, a designer can employ SBD framework to reducing unwanted environmental impacts resulted from the method of use.

The SBD framework is comprised of several elements: design goals, negative or 'unsustainable' behaviors the goals try to find solutions for or prevent, human thinking system, design concepts, and design techniques. The utility of SBD framework is demonstrated with the case study of smartphones to illustrate how one could successfully integrate the human thinking system into product design.

Figure 2:
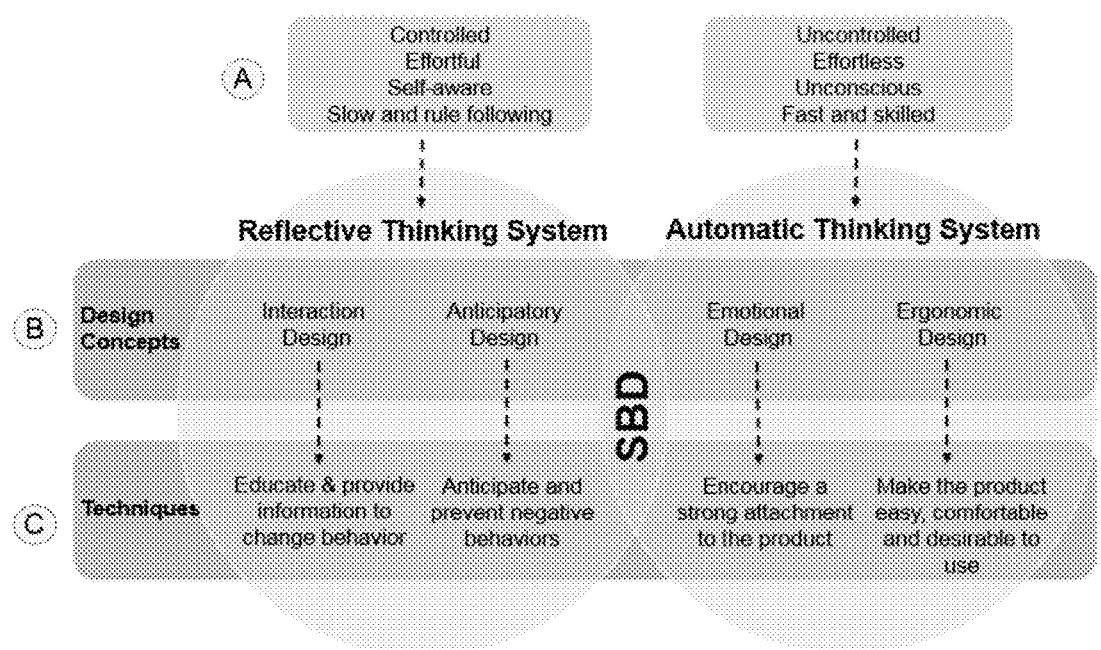
FIG. 2: The SBD framework incorporates (a) distinguishing factors in people's thinking towards the product, (b) potential applicable design concepts, and (c) customized design techniques.

In FIG. 2, the SBD framework incorporates design concepts and techniques that impact the reflective and automatic thinking systems.

This application introduces a design framework that addresses both aspects of the human thinking system and enables people to think and use consumer electronics in a more environmentally friendly, sustainable manner. While the designs has been suggested for consumer electronics, the framework and the utilities can also be applied to appliances, personal transportation, and toys.

2. Development of Sustainable Products and Utilities for Consumer Electronics Devices The SBD framework has been employed to redesign a smartphone and accessories. For this purpose, four goals are defined. Each goal is a high level sustainability goal for usage of a smartphone. For each goal, a number of new implementations or utilities will be introduced to fulfill that goal.

2.1 Goal 1: Reducing Purchase Frequency

In this sub-section, we introduce apparatus and methods to fulfill this design goal. Smartphones are often replaced prior to reaching true obsolescence for various reasons. The first goal, is to reduce the frequency of purchase. FIG. 1 illustrate a range of potential design strategies and methods to respond to this goal. For example, a modular design, or dual packaging can be employed to extend product lifespan or more effective recycling of the product.

2.2 Goal 2: Reducing Energy Consumption

In this sub-section, we introduce apparatus and methods to reduce energy consumption in smartphones. FIG. 4, shows define Goal 2 which is focused on unsustainable usage of battery such as overcharging and undercharging. These will both reduce life of a battery and decrease energy efficiency. For example a battery used in high temperature or plugged in all day to the charger while is fully charged will have a shorter lifespan.

2.2.1 a New Implementation for Charger Mechanism

Figure 5:
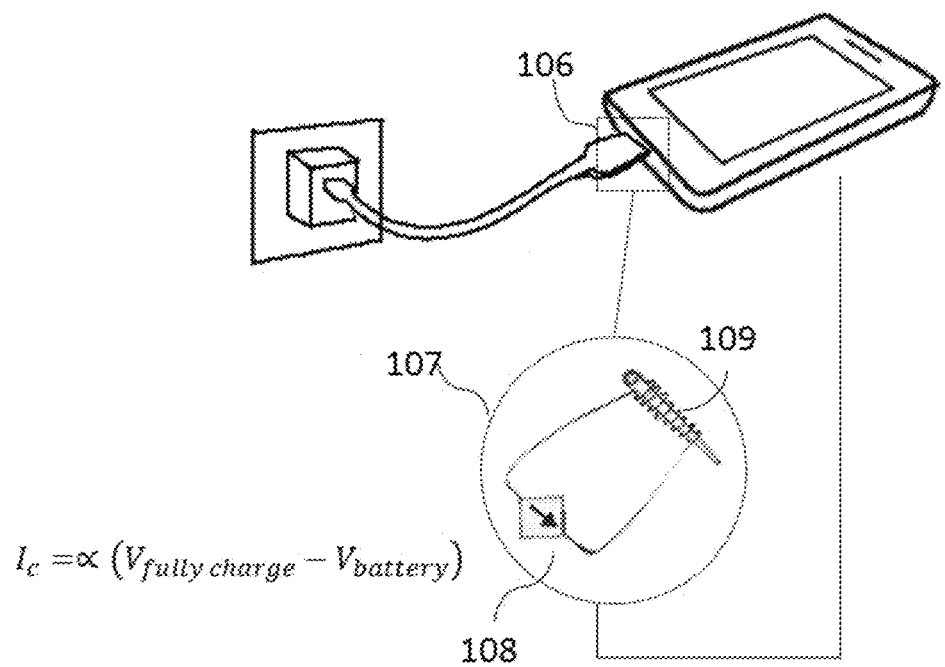
FIG. 5: A new design for charger plug in, that its attachment mechanism is controlled by an electro-magnetic field. The field weakens as the battery is charged.

To address this concern, a charger plug is designed which is slightly difficult to detach from the product while the battery is undercharged, but can be easily removed when the battery is fully charged. FIG. 5 shows a new design for charger plug in, where its attachment mechanism is controlled by an electro-magnetic field. The electromagnetic field weakens as the battery is charged. A slightly different design automatically disconnects the charging cable from the smartphone power port by making the connection loose when the battery is fully charged.

In one embodiment, the battery charger has a detachable mechanism for connection of the cord to the electric device that allow automatic disconnection of the cord when the battery is fully charged. The attachment mechanism 106 can be implemented through an electromagnet system where the current 108 (drifted from the power source and) generating the magnetic field is controlled through a feedback mechanism affected by the charged level of the battery. For example, the intensity of the magnetic field of the attachment 109 can be made proportional to the difference of the battery voltage from the full battery charge level. Alternatively, the average current controlling the electromagnetic field of the plug, might be inversely proportional to the battery voltage level such that as the battery is charged more, the connection becomes looser.

In another embodiment, the intensity of the magnetic field will be determined through changing pulse width modulation (PWM) or pulse duration modulation (PDM) of the input current based on the charged level feedback. Any or all of the following techniques including, delta modulation, delta sigma modulation, space vector modulation, direct torque control (DTC), time proportioning, or other modulation techniques may be applied for the implementation. Therefore, the design interacts with the user to promote them to a sustainable informed decision.

Figure 6:
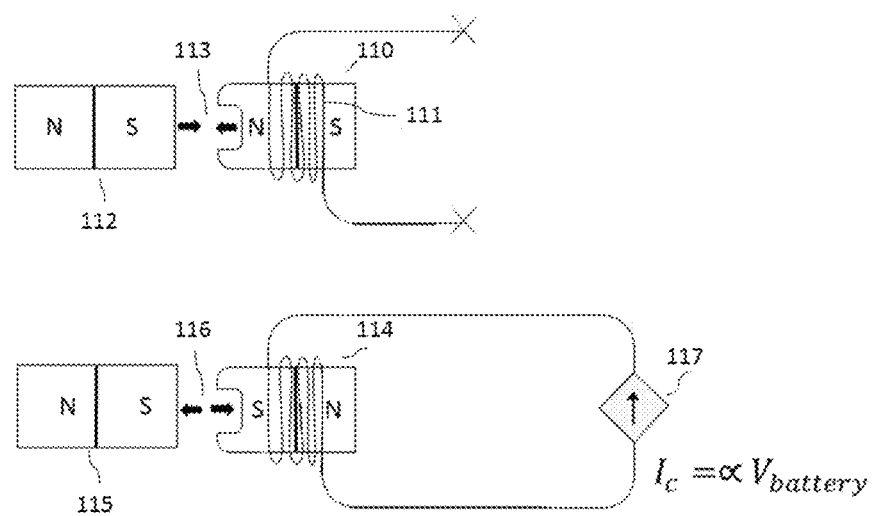
FIG. 6: A new design for charger plug in, wherein the magnetic poles reverted because of the intensity of an electromagnetic field controlled by the battery voltage.

Another implementation for charger plug in is shown in FIG. 6. In this implementation, the magnetic poles of the connectors 110, 112 initially set to attract each other 113 when the current drifted from the battery is zero 111. Then, as the battery charges, the magnetic poles of one connector reverted 110, 114 because of the intensity of an electromagnetic field controlled by the battery voltage. This could happen for example when the electromagnetic field induced by a voltage controlled current source 117 counteracts the effect of the permeant magnetic field in such a way that overall magnetic pole direction reversed 114 (South and North poles reversed in one connector). Therefore, the connectors 114, 115 repel each other 116.

In another embodiment, the feedback mechanism to control the magnetic field is provided by the output of a temperature sensor installed inside the electric device such that if the device gets hotter than a predefined temperature the plugin connector becomes detached from the device. One of the application of such implementation could be safety reasons for example to avoid battery explosion.

One skillful in the art knows that similar techniques may be used to make the design of chargers more sustainable for other electronic consumer products such as laptops, pocket PCs, tablets, PDAs, e-readers, wearable devices, shavers, razors and etc.

One skillful in the art knows that similar techniques may be used in sustainable charger or plugin mechanism of electric cars, cordless drills, cordless vacuums and any other battery dependent machine.

2.2.2 A New Implementation that Allows Air Circulation to the Case

Figure 7:
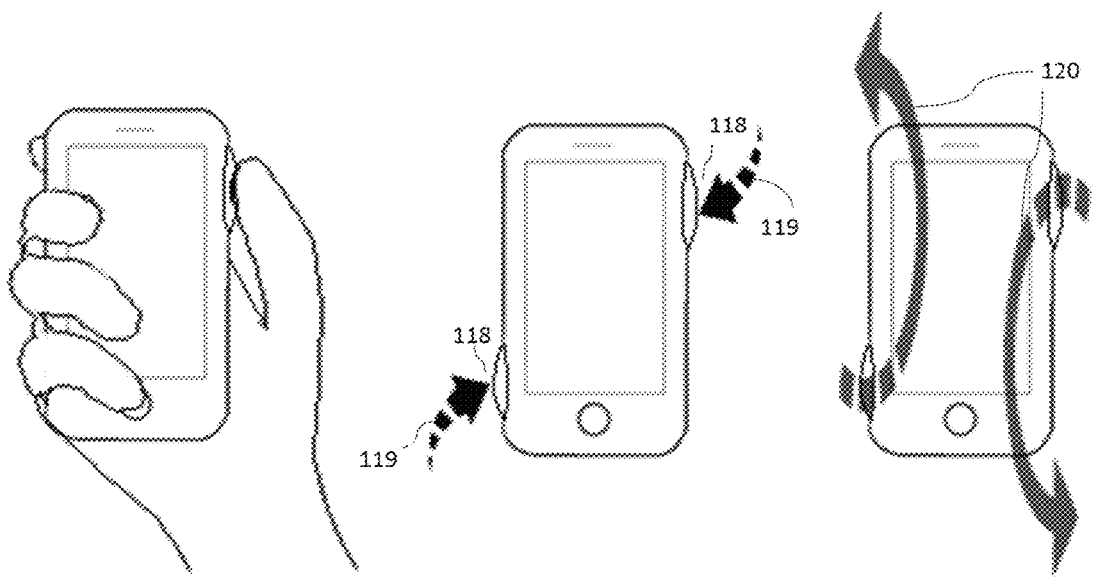
FIG. 7: A squeezable mobile frame that allow air circulation in the mobile case.

In one embodiment, as demonstrated in FIG. 7, a squeezable mobile frame 118 is presented that circulates air 119, 120 into the mobile case and cools down the battery.

2.2.3 A Ventilation System

Figure 8:
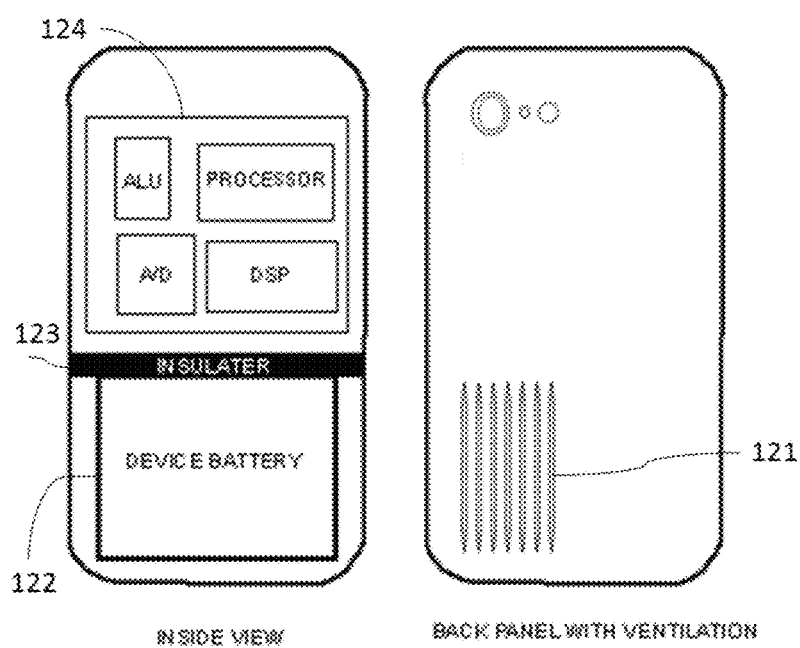
FIG. 8: A ventilation system for the smartphone.

In another embodiment as demonstrated in FIG. 8, a ventilation system is designed that isolate the battery from the electronic board and use a combination of grooved heat sinks. In another design, the body of the smartphone has a perforated surface 121 which allows air to ventilate and cool the battery. A thermal insulator 123 may also be employed to isolate the battery 122 from the electronic processors 124 to prevent heat from passing between them.

One skillful in the art knows that similar apparatus and techniques may be used to improve ventilation inside other electronic devices such as tablets, laptops, pocket PCs, PDAs, e-readers, wearable devices, shavers, razors, and etc.

2.2.4 an Alerting System to Encourage Sustainable Behavior by the User

Figure 9:
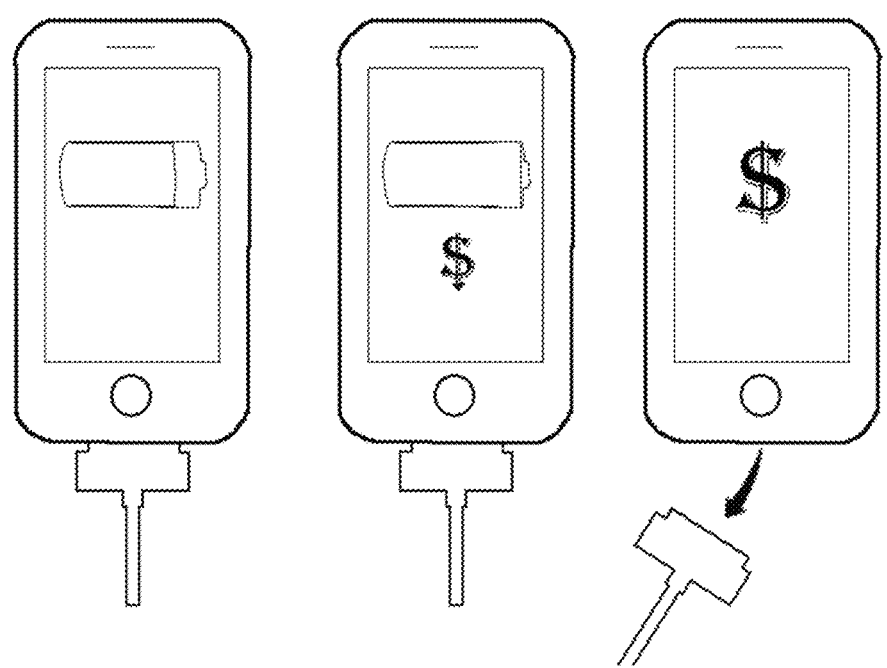
FIG. 9: An alerting system to encourage sustainable behavior by the user.

In addition, some apps and software gadgets may be used in conjunction with temperature sensor(s) located inside or on the surface of the smartphone to alert the user to stop using the device when it gets extremely hot inside (definable through setting a threshold level for the temperature). This system can also be useful for safety purposes to prevent smartphone explosion. Alternatively, an alert system may be employed to encourage sustainable behavior by the user. For example, the system can show a notification that explains the monetary cost of energy being used as shown in FIG. 9.

Moreover, some apps and software gadgets may be used to alert the user to stop charging the device when the battery is over charged.

One skillful in the art knows that similar apparatus and techniques may be used to improve sustainable behavior among the users of other electronic devices such as tablets, laptops, pocket PCs, PDAs, e-readers, personal digital assistants, wearable devices, shavers, razors and etc.

2.3 Goal 3: Minimizing Physical Damage

In this sub-section, we introduce apparatus and methods to minimize physical damage. As shown in FIG. 10, Goal 3 is to protect phone from physical damage, and therefore increasing its lifespan. For example, FIG. 10 shows how specific selection of materials, sensors, or accessories may lead to protecting the phone from accidental dropping or exposing it to water.

FIG. 11 shows using an easy to grip 125 or slip proof material 126 on the frame will make it less likely to drop the phone by accident.

2.4 Goal 4: Encouraging Sustainable End of Life Management

In this sub-section, we propose apparatus and methods to encourage sustainable end of life management in smartphones. FIG. 12 defines Goal 4 as "Encouraging Sustainable End of Life Management". This figure identifies potential solutions to educate or inform users about where to recycle or potential reuse options. In addition, although the packaging of mobile devices is a delicate issue, people usually lose the retailer box and cannot use it again to return it to manufacturer for repair.

2.4.1 A Dual Purpose Packaging Scheme

Figure 13:
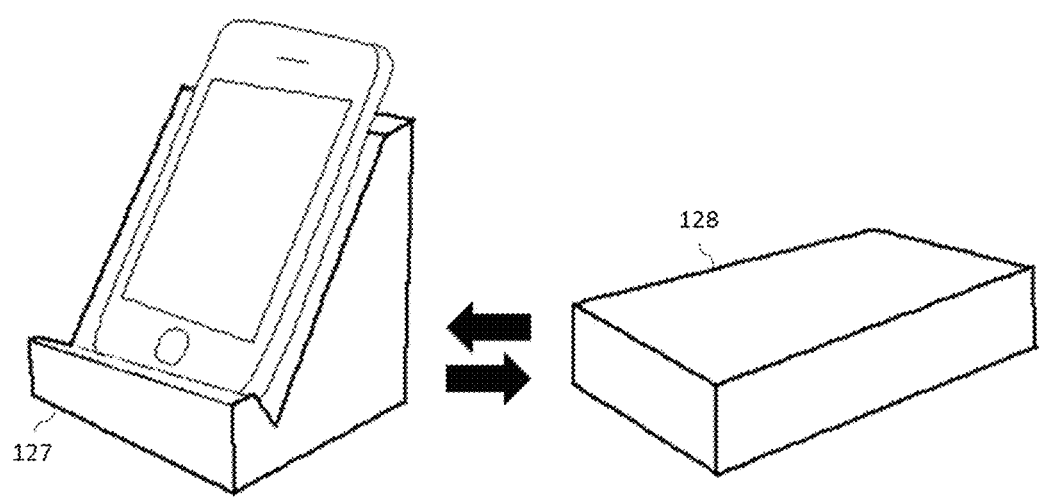
FIG. 13: A dual purpose packaging scheme.

In one embodiment, shown in FIG. 13, a dual purpose packaging scheme is disclosed. In this scheme, the original packaging is designed such that it can be converted to a stand (or base) 127 for the device while the product is in use. This stand is convertible into a mailing package or box 128 later when user decide to send it back to the manufacturer for proper recycling. Needless to say, the original packaging may contain labels which identify the product uniquely (such as S/N) and hence make the recycling much easier. In this design, the package will be folded over to become a stand for the product when it is not in use.

In another embodiment, the original packaging can be designed to be transformable to a passive speaker bass for the phone. In this way, the converted package could be placed on top (or bottom) of the smartphone speaker to make a passive bass. For example, the box can be designed in the right dimension and folded to make a Helmholtz resonator (or universal resonator) which take advantage of air resonant in a cavity to amplify certain frequencies in the sound. In this way, the packaging can be reused to make discrete acoustic filters.

One skillful in the art knows that similar package design could be used to allow dual usage of packaging for other electronic devices such as such as tablets, laptops, pocket PCs, PDAs, e-readers, wearable devices, shavers, razors and etc.

2.4.2 A Loss and Anti-Theft Prevention System Using Radio Frequency Beacons (or Tags)

Figure 14:
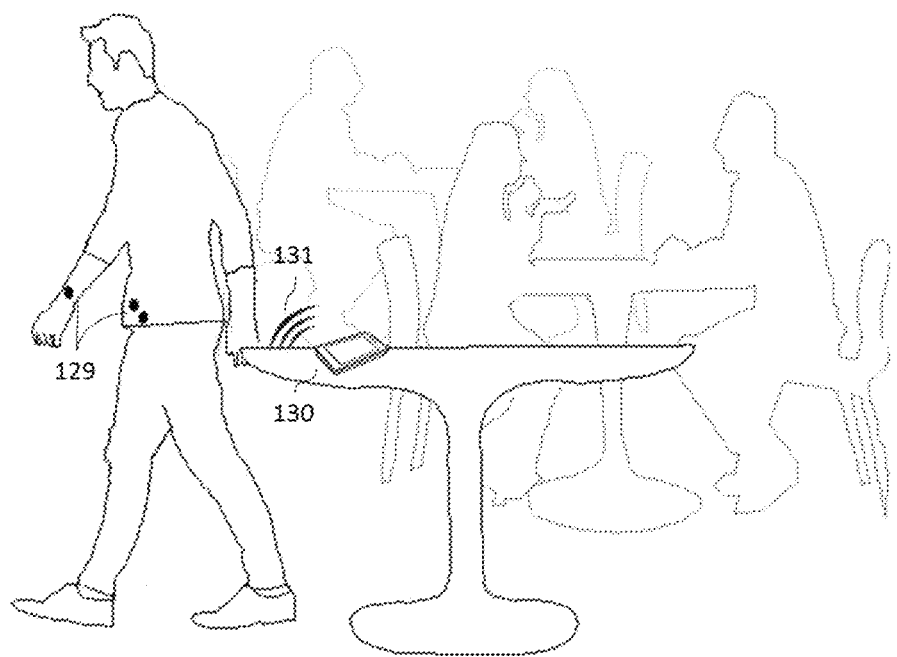
FIG. 14: A loss and anti-theft prevention system for smartphones using radio frequency beacons

In another application, shown in FIG. 14, a loss or anti-theft prevention system using radio frequency beacons is disclosed. The system can alert the smartphone users if they leave their phone or other belongings behind for example in a social gathering or restaurant.

In one embodiment, a system introduced which comprises radio frequency tags, tag reader devices, processor unit, single or multiple transmitter antennas, single or multiple receiver antennas. The radio frequency tags could be active or passive RFiD tags, Bluetooth tags, Bluetooth LE tags, Bluetooth beacons or any other radio transmitter whose signal can be read by tag reader.

The tag reader, processor unit and the receiver antenna(s) may be collocated in a smartphone 130. The processor unit may be capable of doing both signal processing and general processing. The tags may optionally be equipped with speaker or microphones.

Alternatively, the system may employ radio frequency beacons and RF receivers instead of radio frequency tags and tag reader device. Each beacon is capable of transmitting a radio frequency. In addition, it might optionally be capable of broadcasting their transmitted power levels or their identity. The receiver might be capable of scanning the radio frequency spectrum to find out the nearby beacons and measure the received signal. The system may also employ single or multiple antennas for the beacons and single or multiple antennas for the receivers.

In addition, if active tags selected for implementation, they may optionally use energy harvesting techniques (for example from a solar or motion energy source), to lengthen the battery life.

One or multiple beacons (or tags) 129 are carried by the user and other beacons (or tags) will be attached to their belongings 138, 139 such as bags, purses, handbags, keys and so on.

The signal from one beacon (or one tag) or group of beacon (or group of tags) worn by the person will be used by RF receiver (or tag reader) and the processor unit (or the smartphone) to estimate the distance of the user from smartphone by analyzing characteristic of the signal received from this beacon or group of beacons (or this tag or group of tags). The beacons (or tags) on the other belongings provide an approximate of how close they are to RF receiver (or the tag reader) and the processor unit. In case the smartphone act as the RF receiver and processor unit (or tag reader and processor unit), the distance will be estimated relative to the smartphone.

A mapping database may be used to extract the distance estimate based on received signal strength indicator (RSSI) from the beacons (or tags) considering the transmit power.

That mapping database may be built based on propagation model or empirical experiment.

Alternatively, the distance may be estimated by measuring received signal strength indicator (RSSI) from the RF beacon in the smartphone (or multiple smartphones), normalizing the values with the transmit power of the beacon, querying an RSSI-distance mapping database to estimate the distance of the user from each smartphone (or multiple smartphones).

In an alternative implementation, to reduce the effect of noise and fading a time average of RSSI values would be used to calculate RSSI reference values used to query the distance mapping database. This scheme may be useful to improve the accuracy of the distance estimation.

$$RSSI_{ref} = \underset{t}{AVERAGE}(RSSI_t)$$

Figure 15:
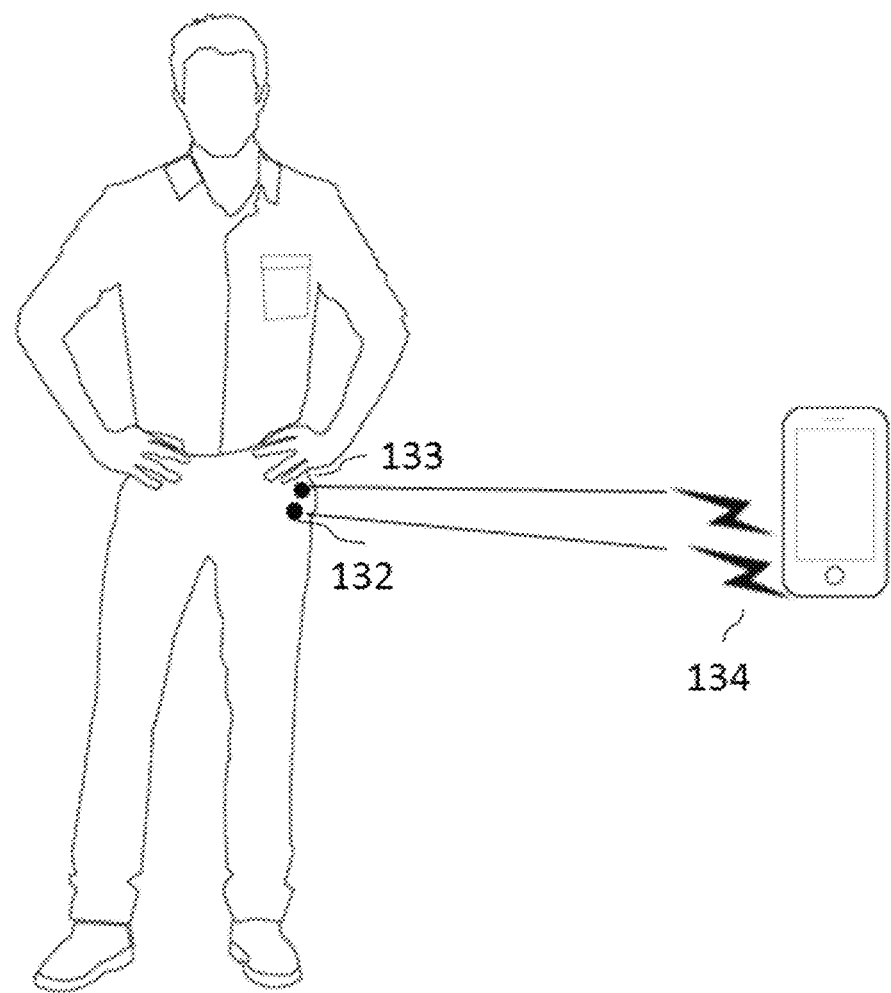
FIG. 15: A distance measurement system employing two co-located beacons.
Figure 16:
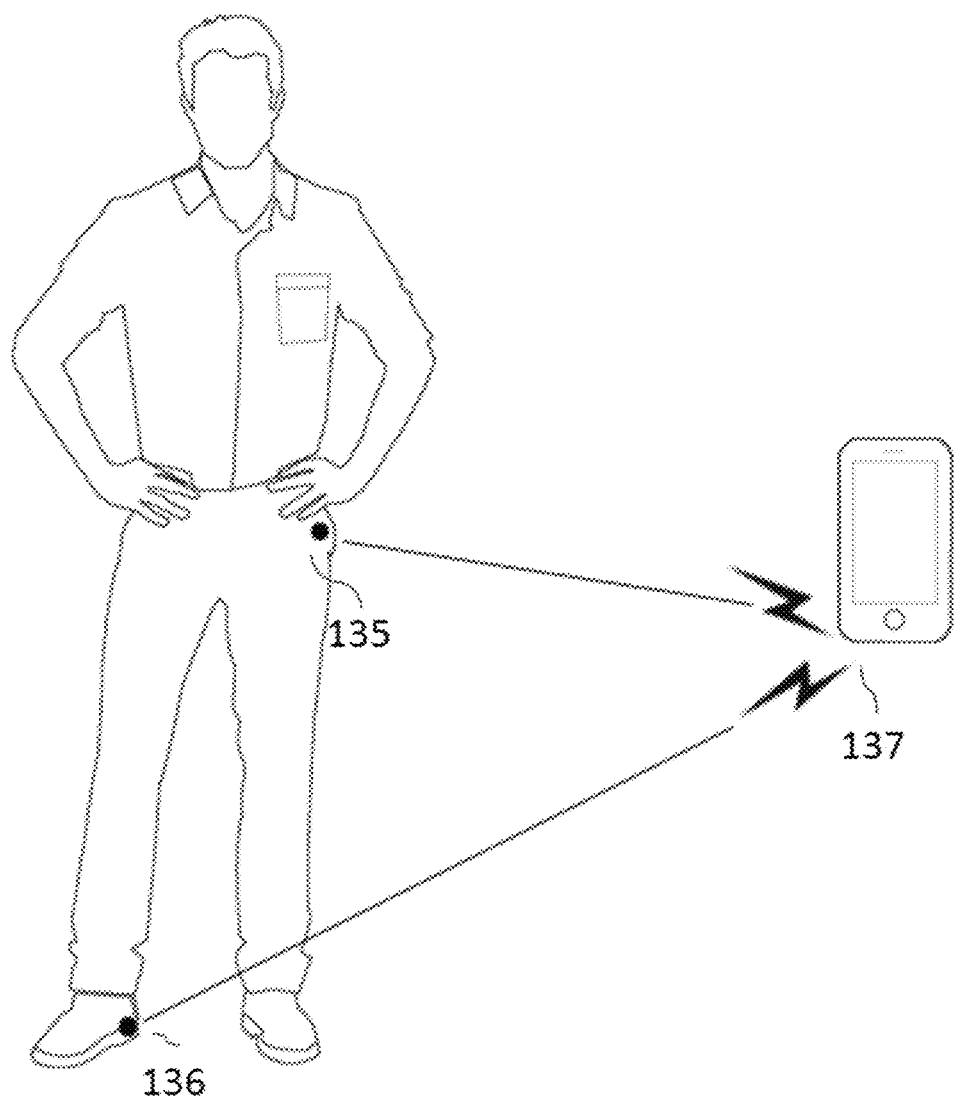
FIG. 16: A distance measurement employing two beacons worn by the user.

In an alternative implementation, two or more beacons (or tags) are worn by the user in different part of the body as illustrated in FIGS. 15-16 and a reference RSSI would be calculated from a combination of RSSI values from these beacons (or tags) before querying the RSSI-distance mapping database.

In one embodiment, two co-located beacons are employed for distance estimation between the person and the object. For example, two beacons (or tags) are worn by the user and they are attached back-to-back 132, 133 (or back-to-front) as illustrated in the FIG. 15. Then, their RSSI values at the smartphone 134 will be used in combination with each other to help reduce the effect of fading and other uncertainties in RSSI for distance estimation. For example, the larger RSSI value from these two could be selected as the reference RSSI to query the mapping database to find corresponding distance.

$$RSSI_{ref} = \max(RSSI_1, RSSI_2)$$

Alternatively, two or multiple beacons 135, 136 (or tags) are worn by the user in different part of the body as illustrated in FIG. 16. For example, one can be worn on the users' shoe 136 (either built into the shoe, built into the insole, or attached to the exterior of the shoe) and the other one will be worn as a wrist band or even clipped 135 to the clothes. The more distance between the beacons, the more reliable would be the RSSI reference.

Another formula that can be used to evaluate the reference RSSI from combination of RSSI values (three or more) would be as follows:

$$RSSI_{ref} = \max_i RSSI_i$$

Alternatively, following formula may be employed to derive the reference RSSI $$RSSI_{ref} = \frac{1}{2} * (RSSI_{(n)} + RSSI_{(n-1)})$$

where $RSSI_{(n)}$ and $RSSI_{(n-1)}$ stands for the two largest values among $RSSI_i$ and n is the number of tags. Each of these formulas mitigates the effect of deep fade to some extent. A time average of these reference signals over a specific time period may be used to mitigate the effect of noise and fading even more. For example $$\text{Average\_RSSI}_{ref} = \sum_{k=1}^{n} RSSI_{ref,k}$$

where $RSSI_{ref,k}$ denote the $RSSI_{ref}$ at time $t=t_k$. In this case, Average_RSSI$_{ref}$ would be used for RSSI-distance mapping.

In another embodiment, the smartphone does not count on the RSSI/distance mapping to evaluate the distance of the objects and the user from the mobile-phone but instead ask the user to indicate the threshold RSSI values to distinguish close, mid-range and far distance. This can be done through a set of experiment where user put a tag connected object in a preferred distance which she/he would consider as maximum distance for a closed object and then press a button or select from a drop-down menu to let the smartphone record the RSSI received from the object as the threshold for close distance. She/he may repeat the experiment to let the smartphone decide suitable RSSI threshold levels corresponding to mid-range or far distance. Needless to say that as few as one or as many as needed thresholds may be defined and used depending on the application.

The beacons (or tags) worn by the user will be defined as primary beacons (or primary tags). The software will be programmed such that if the distance of the smartphone and primary beacons (or tags) becomes more than a preset value (or alternatively if the beacons/tags go beyond the close or mid-range distance) both devices start beeping which is an indication that the smartphone is getting far from the user. This mechanism helps to remind the user if they left the smartphone behind. The beeping mechanism may be programmed such that the sound gets softer as the primary beacons (or primary tags) and the smartphone get closer to each other. This helps the user to move in the area and find the location of the smartphone if it is located somewhere out of sight.

In another embodiment, an easy mechanism is used to temporarily disable the beeping feature between the primary beacons (or primary tags) and smartphone for a predefined period of time (that can be selected, for example, from a drop-down menu containing 5, 15, or 30 minutes). That is useful, for example, when the user goes to the bathroom while he/she leaves his/her smartphone and other belongings on the table or with a friend. The system not only provides a mechanism to link the smartphone and the user but also is useful to link secondary beacons (or secondary tags) too. That's because a similar threshold setting mechanism can be used to control the distance of the secondary beacons (or secondary tags) from the smartphone while the primary beacons (or primary tag) is in the vicinity of the smartphone. If the distance of the secondary beacons (or secondary tags) from the phone gets farther from the preset radius, while the smartphone and the primary tags are located close to each other, the smartphone and secondary/primary beacons (or secondary/primary tags) may start beeping again. The beeping mechanism may be programmed such that the sound gets softer as the secondary beacons (or secondary tags) and the smartphone get closer to each other to help finding the secondary tags. In addition, a separate beeping sound may be allocated to each beacon (or tag) in order to differentiate which beacon (or tag) is out of the close ring.

The smartphone acts as a base station for this design where all the signals from each beacon (or tag) can be received and analyzed. If the purpose of loss prevention is not the smartphone itself, then any other smart device, for example smart-watch, tablets, pocket PCs or wearable smart-DSP chips, can be used to receive and analyze (and potentially control) the signals from each beacon (or tag).

Figure 17:
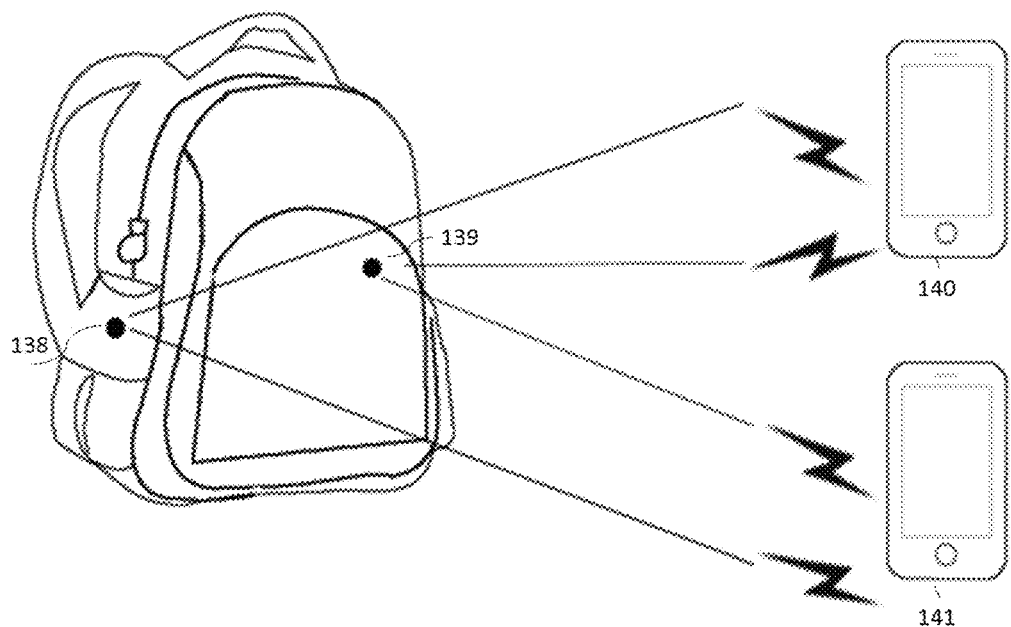
FIG. 17: An object localizer system employing two closely attached beacons and two base-stations (smartphones). The base-stations share data with each other to improve accuracy of location estimation.

In another embodiment, an object localizer system employing two attached beacons and two base-stations (smartphones) are disclosed as illustrated in FIG. 17. In this scheme, if two or more smartphones 140, 141 are available in the same area, they can share their relative locations and the RSSI values from the objects to provide a more reliable estimate of the location of the surrounding beacons 138, 139 (or RF tags) as shown in FIG. 17. This could be done through an approximate trilateration (or multilateration) technique or HD-GNSS techniques, which are well-known in GNSS application. In addition, the data may be used to filter unreliable RSSI values. Alternatively, the two smartphones may employ the shared data to find out the orientation of the object toward, or just a better estimate of the distance from, each of them.

It is also possible to design a graphical user interface to illustrate the relative distance of all beacons (or RF tags) from the phone. The GUI may also provide a user-friendly mechanism to define the beacons (or tags) allocated to each object. In case more than two mobile devices are used as a base station and share the data, it is possible to show in what direction the object is from the mobile phone. The software application may use smartphone gyroscope data to update this direction as the user turns the phone.

Figure 18:
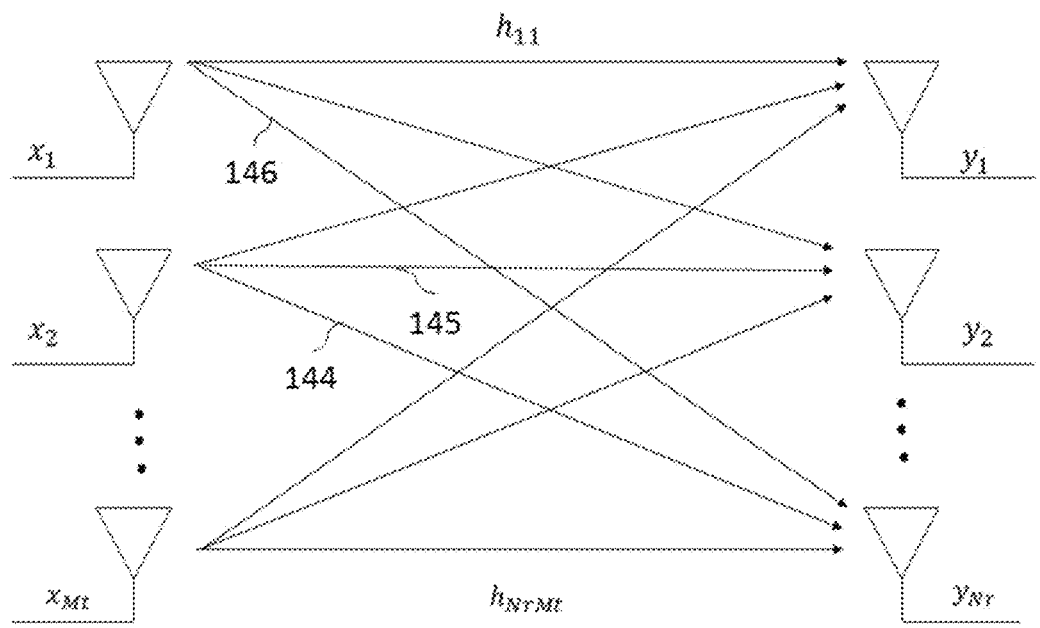
FIG. 18: RSSI matrix calculated for multiple transmitter and receiver antennas.

In another embodiment, the relative distance and location of the tags would be evaluated based on signals transmitted from plurality of transmitter antennas 142 on the RF beacon (or RF tag) to plurality of receiver antennas on the smartphone 143 (or tag reader). For example, the RSSI matrix calculated from each signal traveling between each transmitter and each receiver signal may be used to estimate the distance from the center of transmitter antennas to the center of receiver antennas (FIG. 18). This scheme may be useful on mitigating the effect of fading, noise and other uncertainties on RF signals.

Figure 19:
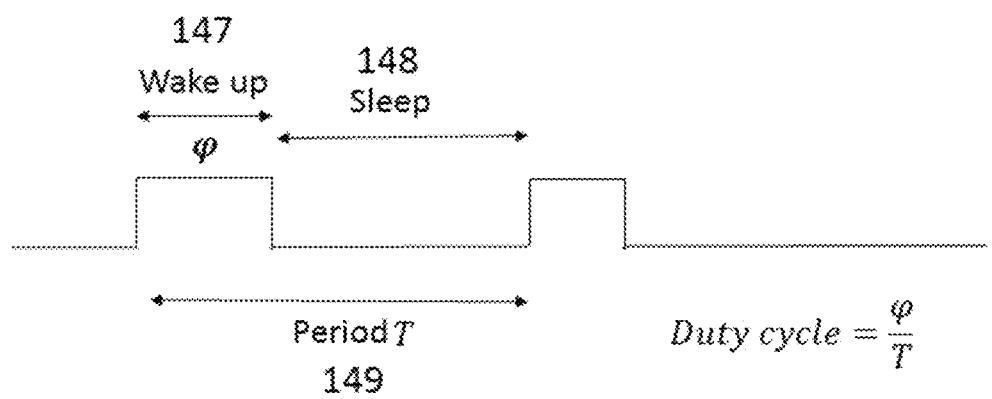
FIG. 19: Wakeup-sleep cycles and relevant parameters.

In one embodiment, the above-mentioned transmitters may become enabled based on an adjustable duty cycle on a periodic basis 149. This helps the smartphone or potential active tags (or beacons), save energy on the sleep cycle 148 as demonstrated in FIG. 19. The duty cycle and period of wakeup-sleep 147, 148 may be adjusted for different type of tags and different energy saving goals. In addition, these parameters may adaptively be controlled through a feedback from the device battery. This may help the battery require less frequent charging.

In another embodiment, the system may employ two different types of tags (or beacons) simultaneously to increase the accuracy of distance measurement.

Moreover, one skillful in the arts knows that similar methods and apparatus can be used to monitor kids' activity in a public environment. In this application, relative location and distance of kids from their parents may be identified using signals transmitted or received from single or plurality of smartphone devices to single or plurality of RF beacons (or RF tags) worn by kids through the above-mentioned techniques.

One skillful in the art knows that the above-mentioned techniques may also be employed using any wearable device capable of transmitting an RF signal or reading an RF beacon (or RF tag) instead of an smartphone. These wearable devices include but not limited to smart watches, wearable DSP processors and so on. In addition, the same techniques may be applied on tablets, PDAs, e-readers, wearable devices, or pocket PCs to prevent leaving them behind or to localize objects around them.

One skillful in the arts knows that the above-mentioned methods and apparatus may be used for any indoor or dense urban localization and tracking where signal from satellite is either not available or does not provide any accurate estimate. The localization may be done through for example measuring received signal strength indicator (RSSI) of the RF beacon in multiple fixed base stations installed around the facility (or multiple smartphones), normalizing the values with the transmit power of the beacon, querying an RSSI-distance mapping database to estimate the distance of the user from each fixed base station (or multiple smartphones), and using a trilateration/multilateration techniques. In addition, in the case that smartphones or base-station take benefit from multiple antennas, the direction of arrivals techniques may be employed to find out the location of the objects attached to beacons (or RF tags). Therefore, the application is included but not limited to theft prevention systems in retail stores, lost object tracking, children safety watching, staff tracking and so on.

One skillful in the arts knows that before-mentioned techniques for distance measurements and localization through measuring RF signals traveling between smartphone and RF devices attached to the target object, can be implemented similarly if smartphone transmits the RF signals and the signal is measured at RF receivers attached to the object. In addition, the accuracy of distance mapping can be increased if combination of RSSIs from multiple antennas on the receiver side (or equally a combination of RSSIs from multiple antennas in the transmitter or multiple antennas in both sides) is employed.

Figure 20:
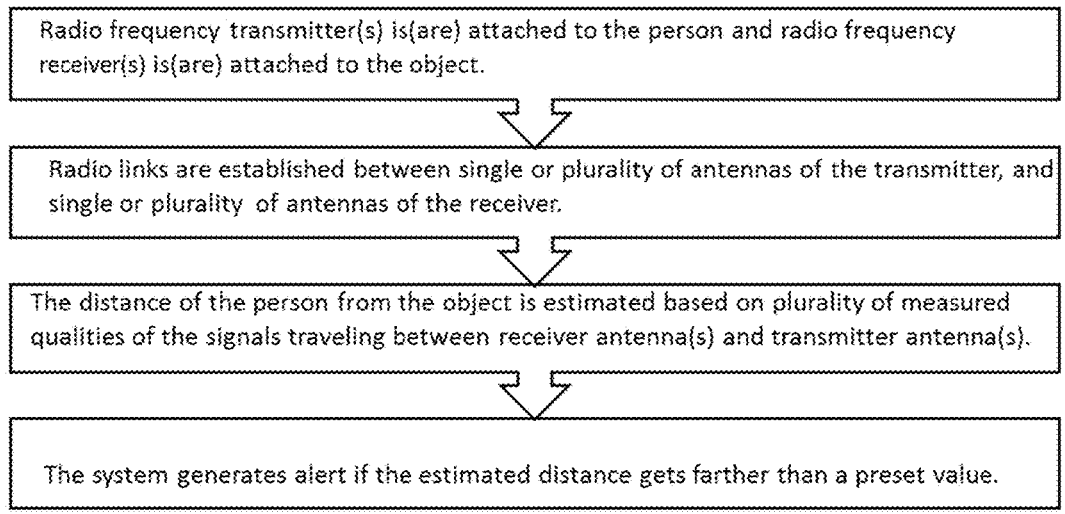
FIG. 20: Mechanism 1 of alerting the loss of an object.
Figure 22:
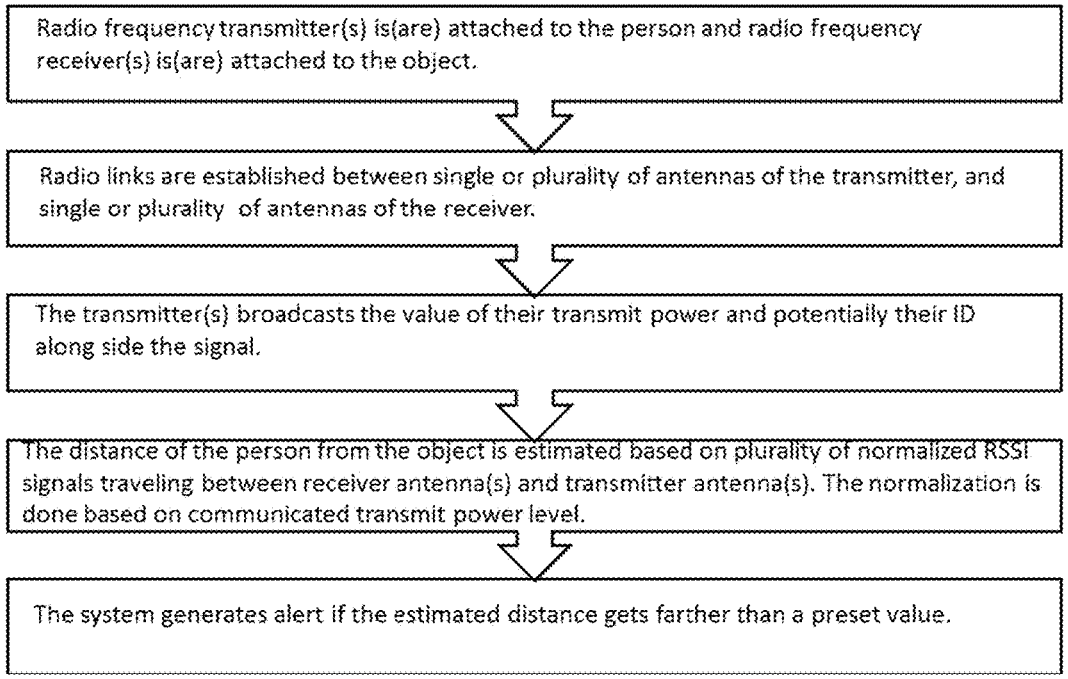
FIG. 22: Mechanism 3 of alerting the loss of an object using normalized RSSI as signal quality.

FIGS. 20 and 22 encapsulates two mechanisms of implementing the overall anti-loss alerting system when RF transmitters are attached to the person. In mechanism described in FIG. 22, a normalized RSSI is used to evaluate the quality of the received signal.

Figure 21:
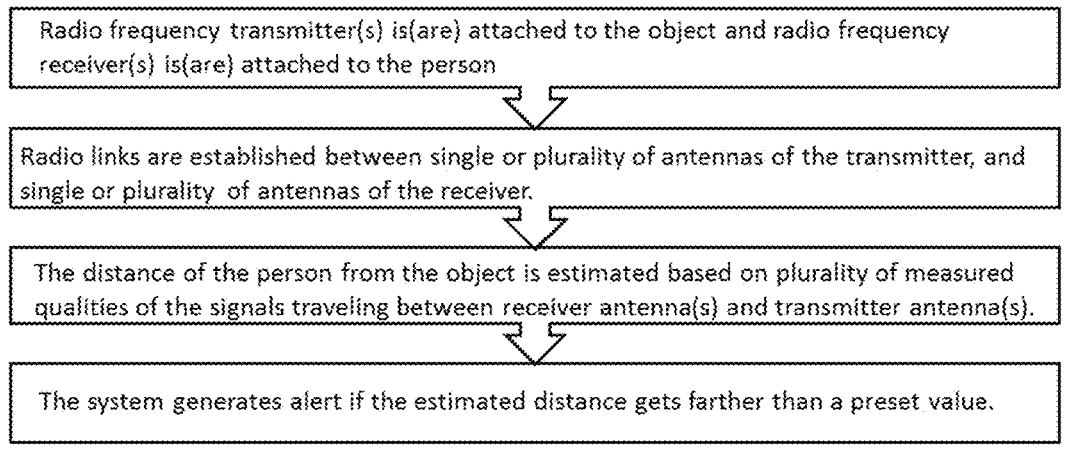
FIG. 21: Mechanism 2 of alerting the loss of an object.
Figure 23:
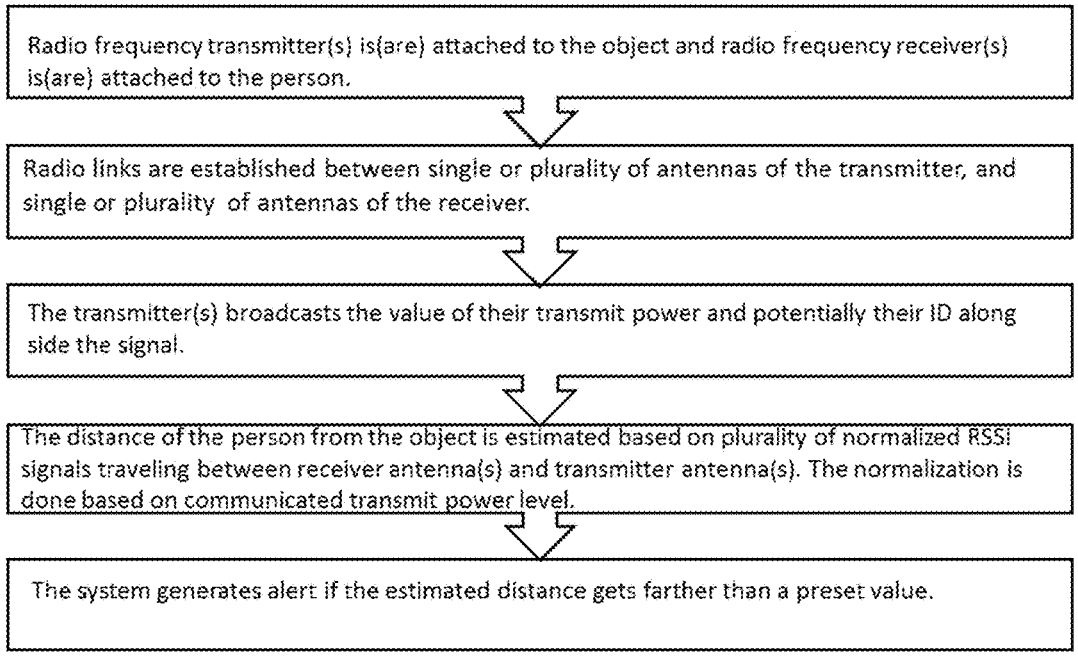
FIG. 23: Mechanism 4 of alerting the loss of an object using normalized RSSI as signal quality.

FIGS. 21 and 23 encapsulates two mechanisms of implementing the overall anti-loss alerting system when RF transmitters are attached to the object or when the smartphone transmit the RF signal. In mechanism described in FIG. 23, a normalized RSSI is used to evaluate the quality of the received signal.

One skillful in the arts knows that the same techniques and methods may be employed using acoustic or sonar transmitters and receivers instead of radio frequency beacons and receivers for loss and theft prevention.

Although some elements and features of this disclosure are described in specific combinations or might seem complimentary to each other, one skillful in the art knows that each element or feature can be utilized alone or in a different combination with others. In addition, the methods described above may be used by any other consumer electronics devices.

What is claimed is:

1. A plug for charging an electronic device,
wherein the plug will be automatically detached from a power port of said device when the device battery is fully charged, comprising;
an electromagnetic system, comprising;
at least two magnetic bodies, wherein first magnetic body is attached to said power port and second magnetic body is attached to said plug of the electronic device,
an electronic circuit to induce a pulse width modulated (PWM) current through a coil of wire attached to at least one of said magnetic bodies, wherein said PWM current induces a magnetic field in said at least one of said magnetic bodies, an attachment/detachment mechanism controlled by changing the direction of poles and the intensity of magnetic field in said at least two magnetic bodies,
a feedback loop from the charged level of the device battery;
wherein the direction and intensity of the magnetic field induced in said coil of wire is determined by the direction and the value of the average current flows through the coil of wire; and,
wherein the direction and the value of the average current flows through the coil of wire is determined by the duration of the pulse in said PWM current; and,
wherein the feedback loop controls the duration of the pulse in said PWM current; and,
wherein the attachment/detachment mechanism detaches said plug from said power port when the direction of poles in one of said two magnetic bodies flipped.

2. The plug of claim 1, wherein the detaching mechanism is via making the connection loose when the battery is fully charged.

3. The plug of claim 1, wherein the duration of the pulse in said PWM current is used to revert the direction of poles induced by that current to detach the connection between the plug and the device power port.

4. The plug of claim 1, wherein the average current flows through said coil of wire is proportional to the difference of the device battery voltage from the full battery charge level.

* * * * *